United States Patent
Stojic

[11] Patent Number: 6,148,711
[45] Date of Patent: Nov. 21, 2000

[54] NORMALLY-CLOSED DIAPHRAGM CHECK VALVE

[75] Inventor: Steven M. Stojic, Holland, Mich.

[73] Assignee: Holland Neway International, Inc., Muskegon, Mich.

[21] Appl. No.: 09/205,928

[22] Filed: Dec. 4, 1998

Related U.S. Application Data

[60] Provisional application No. 60/067,394, Dec. 5, 1997.

[51] Int. Cl.[7] ........................................ F15B 13/04
[52] U.S. Cl. ................... 91/440; 92/63; 137/509
[58] Field of Search ........................ 91/440, 376; 92/62, 92/63, 48, 49; 137/509

[56] References Cited

U.S. PATENT DOCUMENTS

| | | |
|---|---|---|
| 2,918,878 | 12/1959 | Zieg et al. . |
| 2,931,616 | 4/1960 | White et al. . |
| 3,101,219 | 8/1963 | Herrera . |
| 3,155,012 | 11/1964 | Ayers, Jr. . |
| 3,659,501 | 5/1972 | Beard . |
| 3,696,711 | 10/1972 | Berg et al. . |
| 3,712,178 | 1/1973 | Hensley . |
| 3,730,056 | 5/1973 | Swander, Jr. . |
| 3,908,520 | 9/1975 | Ma . |
| 3,991,659 | 11/1976 | Robinson . |
| 4,509,409 | 4/1985 | Reeves . |
| 4,594,058 | 6/1986 | Fischell . |
| 4,960,036 | 10/1990 | Gummer et al. . |
| 5,320,135 | 6/1994 | Pierrov . |
| 5,460,076 | 10/1995 | Pierce et al. ................................. 92/48 |

FOREIGN PATENT DOCUMENTS

| | | |
|---|---|---|
| 531795 | 10/1956 | Canada . |
| 513774 | 2/1955 | Italy . |
| 53-7809 | 1/1978 | Japan . |

*Primary Examiner*—Edward K. Look
*Assistant Examiner*—Thomas E. Lazo
*Attorney, Agent, or Firm*—Rader, Fishman, Grauer & McGarry, an office of Rader, Fishman & Grauer PLLC

[57] ABSTRACT

A spring brake actuator being divided into a first spring brake chamber and a second spring brake chamber by a diaphragm extending across the actuator. A pressure plate is provided in the first spring brake chamber and rests on the diaphragm. A power spring is positioned between the spring brake chamber housing and the pressure plate to urge the pressure plate toward the bottom of the actuator housing. Pressurized air is supplied to the second spring brake chamber to hold the power spring in a compressed state. A normally closed one-way check valve extends through the pressure plate and the diaphragm to provide for temporary fluid communication between the first spring brake chamber and the second spring brake chamber upon the exhausting of pressurized air from the second spring brake chamber to thereby prevent the creation of a vacuum in the first spring brake chamber that might retard the application rate of the spring brake actuator.

77 Claims, 7 Drawing Sheets

NORMALLY-CLOSED DIAPHRAGM CHECK VALVE

CROSS REFERENCE TO RELATED APPLICATIONS

This application claims the benefit of provisional application Ser. No. 60/067,394, filed Dec. 5, 1997.

BACKGROUND OF THE INVENTION

1. Field of the Invention

The invention relates to fluid-operated brake actuators for vehicles and, more particularly, to a fluid-operated actuator with a normally-closed check valve for regulating fluid flow within the fluid-operated brake actuator.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a large-force compression spring that applies the brake when the air is released. This is often referred to as the spring brake. Typically, the spring brake actuator is disposed in tandem with the service brake actuator.

The spring brake actuator is typically divided into two-chambers separated by a diaphragm and pressure plate, with the spring in one of the chambers acting between an end wall of the spring brake housing and the pressure plate. When full air pressure is applied to the opposite chamber, air pressure acting against the diaphragm and pressure plate compresses the spring. In many applications, a spring brake actuator rod is held in a retracted position by a relatively small return spring. In newer applications, the spring brake actuator rod is integral with the pressure plate and held in a retracted position by the air pressure.

In both designs, the spring brake actuator rod does not affect the normal operation of the brake. The service chamber is typically divided into two chambers by a diaphragm. Depressing the brake pedal during normal driving operation introduces compressed air into one of the chambers of the service brake actuator which, acting against the diaphragm, causes a service brake push rod on the other side of the diaphragm to be extended and the brakes to be applied with an application force proportional to the air pressure in the service brake actuator.

In the event of a loss of air pressure or an intentional exhaustion of air from the spring brake actuator, the brake will be mechanically activated by the force of the large-force compression spring acting on the spring brake actuator rod which, in turn, acts upon the service brake push rod to apply the brakes. Thus, the spring brake portion serves both as a parking brake and as an emergency brake.

In tandem actuator assemblies, the spring brake push rod typically extends from a chamber in the spring brake portion, through an aperture in a wall separating the spring brake actuator from the service brake actuator, and into a chamber in the service brake portion. Because at least one of the adjoining chambers is usually pressurized, an O-ring seal is provided at the aperture around the push rod.

When air pressure is released from the spring brake actuator, the spring and diaphragm extend significantly, expanding the volume of the spring brake actuator chamber containing the spring. As the volume of the spring brake actuator chamber increases, air must enter the expanded volume of the chamber to prevent a vacuum from forming in the spring brake actuator chamber and thereby retard the application of the spring brake. When the spring is retracted, the volume of the chamber contracts and air must be evacuated from the chamber. In many prior brake actuators, the chamber containing the spring is simply open to atmosphere through ports in the chamber housing. However, an open chamber allows dirt, salt, moisture and other unwanted material to enter that chamber through the ports. With the advent of hollow actuator rods containing caging tools, the presence of foreign material within the actuator rod has become an increasing concern of brake designers.

Some prior designs have attempted to address the problem of reducing or eliminating the vacuum in the spring brake actuator chamber by providing a breather tube between the push rod chamber of the service brake actuator and the spring chamber of the spring brake actuator, as in the U.S. Pat. No. 4,960,036 to Gummer et al. In this design, the push rod chamber of the service brake actuator must be vented to atmosphere for normal application of the brakes. Venting of the push rod chamber occurs either through a separate vent, or through the external opening carrying the push rod. Thus, the spring chamber of the spring brake actuator remains open to atmosphere, and is still exposed to moisture, dirt and grime, albeit through a longer passage than a fully vented spring chamber. This longer passage may also prevent the spring chamber from drying as effectively as a sealed or more fully vented spring chamber.

SUMMARY OF THE INVENTION

The invention relates to an air-operated brake actuator for actuating and releasing a brake in response to the introduction or exhaustion of pressurized air. The rake actuator comprises a housing defining an interior chamber that is adapted to old pressurized air. A moveable member is provided within the housing and divides the interior chamber into a first brake chamber and a second brake chamber. One of the first and second brake chambers is adapted to normally receive pressurized air to urge the moveable member to move in a first direction. The moveable member has a fluid conduit therethrough to establish fluid communication between the first brake chamber and the second brake chamber. Force means are provided to urge the moveable member in a second direction opposite the first direction. An actuator shaft is provided having a proximal end that is operatively connected to the moveable member and a distal end extending through an opening in the housing for connection to a brake.

A check valve is mounted to the moveable member at the fluid conduit. The check valve includes a moveable valve element having a back side and a front side. The valve element is moveable between a normally closed position where the valve element substantially prohibits fluid flow through the fluid conduit and an open position where the fluid flow through the fluid conduit is enabled. The front side of the valve element is in fluid communication with the pressurized brake chamber. The check valve further includes a reservoir in fluid communication with the moveable valve element back side. Additionally, the check valve includes a flow restrictor fluidly connecting the pressurized chamber to the reservoir.

In operation, when pressurized air from the pressurized chamber begins to be exhausted and the force means urges a moveable member in one of the first and second directions to thereby increase the volume of the non-pressurized brake chamber, a pressure differential forms across the front and rear sides of the moveable valve element. The pressure differential is formed because of the slower depressurization of the reservoir through the flow restrictor than the depressurization of the pressurized brake chamber. The pressure differential urges the moveable valve element from the normally closed position to the open position to thereby permit air flow between the first and second brake chambers, reducing vacuum retardation in the non-pressurized chamber.

Preferably, the check valve includes a biasing device to bias a moveable valve element into the normally closed position. This biasing device can be a spring or similar biasing device. The flow restrictor preferably restricts the flow rate of air between the fluid reservoir and the pressurized brake chamber to a rate less than the exhaustion rate of air from the pressurized brake chamber.

The moveable member can be a pressure plate, diaphragm, or a combination of the pressure plate and diaphragm. The pressure plate can include a recess in fluid communication with the moveable valve element back side to define the check valve fluid reservoir.

The flow restrictor can comprise a fluid conduit extending between the pressurized chamber and the fluid reservoir. The flow restrictor preferably includes a reduced cross-sectional area portion that restricts the flow of fluid through the fluid channel. A filter can be placed within the fluid channel and can also function as at least a portion of the flow restrictor. Alternatively, the flow restrictor can be an imperfect seal positioned between the fluid reservoir and the pressurized brake chamber. The imperfect seal preferably comprises an O-ring sandwiched between two bearing collars.

The force means can comprise a large compression spring disposed between the housing and the pressure plate. Alternatively, the force means can include a return spring.

The brake actuator can be either a spring brake actuator for applying parking or emergency brakes. Alternatively, the brake actuator can be a service brake actuator for applying the operational brakes of a vehicle. The brake actuator can also be used in a piston-type brake. Additionally, the brake actuator can be a spring brake actuator in combination with a service brake actuator.

DETAILED DESCRIPTION OF THE DRAWINGS

Figure 1:
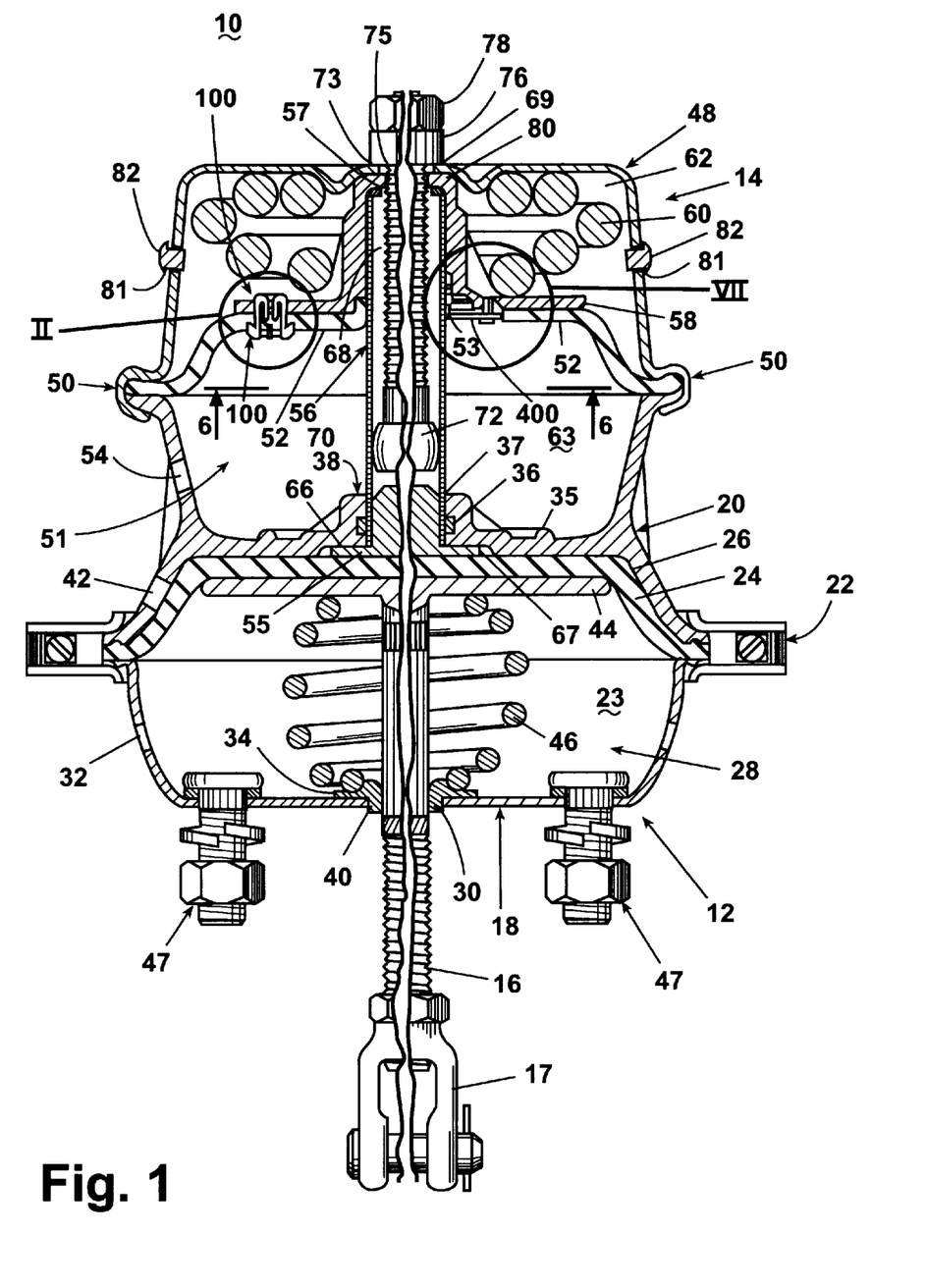
FIG. 1 is a cross-sectional split view of alternative embodiments of a fluid-operated brake actuator having a check valve according to the invention and showing the second spring brake chamber fully pressurized.

FIG. 1 illustrates a fluid-operated brake actuator 10 having a general configuration well known in the art. The fluid-operated brake actuator 10 comprises a service brake actuator 12 mounted in tandem to a spring brake actuator or emergency brake actuator 14. Although the invention is illustrated with respect to a fluid-operated spring brake having a tandem construction, the invention can be used in any type of brake, including non-tandem, fluid-operated spring brakes in which the spring chamber is separated from the service chamber.

A service brake push rod 16 extends from the service brake actuator 12 for reciprocating movement between a retracted position and an extended actuating position relative to the service brake actuator 12, and has a clevis 17 adapted to connect to a conventional brake shoe and drum (not shown) in a standard fashion. Reciprocating motion of the service brake push rod 16 provides activating means for alternately applying and releasing the brake.

The service brake actuator 12 has a housing defined by a cup-shaped service housing section 18 and a double cup-shaped adapter housing 20 joined together by a clamp 22 to form a service brake chamber 23. The adapter housing 20 is also sometimes known as a flange case. The service brake chamber 23 is divided into two sections by a dividing means. Preferably, the dividing means is a first elastomeric diaphragm 24 (also known as the service brake diaphragm) suspended within the service brake chamber 23, the peripheral edge thereof secured in fluid tight enclosure between the cup-shaped service housing section 18 and the service side of the adapter housing 20 by the clamp 22.

The first elastomeric diaphragm 24 separates the service brake chamber 23 into two portions: a first service chamber portion 26 and a second service chamber portion 28. The first service chamber portion 26 communicates with a source of pressurized air (not shown) through an air service port 42 in the adapter housing 20. The second service chamber portion 28 is vented to the atmosphere through at least one opening 32 in the cup-shaped service housing section 18. In FIG. 1, the first service chamber portion 26 is shown evacuated so that the first elastomeric diaphragm 24 is forced against the adapter housing 20 because of the force from compression spring 46 in the second service chamber portion 28.

The service brake push rod 16 extends through a central opening 30 in the cup-shaped service housing section 18 and has a pressure plate 44 at the end thereof within the second service chamber portion 28. The pressure plate 44 bears against the first elastomeric diaphragm 24. A compression spring 46 extends between the pressure plate 44 and the interior surface of the cup-shaped service housing section 18. A push rod guide 34 having an annular seat 40 is disposed within the central opening 30 to guide reciprocal movement of the service brake push rod 16 within the central opening 30 and also to receive the end of the compression spring 46 and retain it in position around the central opening 30. The compression spring 46 urges the pressure plate 44 and the service brake push rod 16 to a fully retracted position as depicted in FIG. 1.

To operate the service brake actuator 12, compressed air is introduced through the air service port 42 into the first service chamber portion 26 to create a force against the first elastomeric diaphragm 24 and pressure plate 44 sufficient to overcome the force of the compression spring 46, thereby extending the service brake push rod 16 toward the actuating position. The openings 32 permit rapid evacuation of air from the second service chamber section 23 as the service brake is actuated. Mounting studs 47 are provided to mount the fluid-operated brake actuator 10 onto a vehicle (not shown).

The spring actuator or emergency brake actuator 14 has a housing defined by the spring side of the adapter housing 20 and a generally cylindrical head or spring chamber 48, which is clamped to the spring side of the adapter housing 20 by a clamp 50 to form the spring brake chamber 51. The spring brake actuator is divided into two portions by a movable member such as a second elastomeric diaphragm 52, known as the spring diaphragm, that is suspended within the spring brake chamber 51. In other brake configurations, the movable member may be a piston. The peripheral edge of the spring brake diaphragm 52 is secured between the cylindrical head 48 and the spring side of the adapter housing 20 by the clamp 50. The second elastomeric diaphragm 52 divides the spring brake chamber 51 into two portions: a first spring chamber portion 62 and a second spring chamber portion 63. The second spring chamber portion 63 is filled with pressurized air supplied through an air service port 54 in the adapter housing 20 when the emergency brake is in its normal released position as depicted in FIG. 1.

The adapter housing 20 includes a divider wall 35 that separates the adjoining service brake chamber 23 and spring brake chamber 51. A spring brake actuator rod 56, aligned with the service brake push rod 16, has one end extending from the spring brake chamber 51 through a central opening 37 in divider wall 35 for reciprocating motion through the central opening 37 between a retracted position and an actuating position. One or more O-ring seals 36 are provided in the central opening 37 through which the spring brake actuator rod 56 reciprocates.

A distal end 55 of the spring brake actuator rod 56 terminates in a reaction plate 66 in the first service chamber portion 26, and which is received in an annular seat 67 when the spring brake actuator rod 56 is in the retracted position as depicted in FIG. 1. An opposite, proximal end 57 of the actuator rod 56 extends through an opening 53 in the second elastomeric diaphragm 52 and terminates in a pressure plate 58 which abuts an end of a large force compression spring 60. The pressure plate 58 abuts one end of the compression spring 60.

The spring brake actuator rod 56 can be solid, but is preferably a hollow tube or rod provided with a central bore 68 to accommodate a brake release rod or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The caging tool 70 comprises a threaded elongated shaft 71, with one end having an enlarged head portion 72. The opposite end of the caging tool 70 is threaded through a head nut 76 fixedly mounted to the cylindrical head 48, and has a hex head nut 78 fixedly secured thereto.

The caging tool 70 primarily serves to enable manual retraction of the powerful compression spring 60. Rotation of the hex head nut 78, threads the shaft 71 through the head nut 76, to axially move the caging tool 70 with respect to the cylindrical head 48. The enlarged head portion 72 slides freely within the central bore 68 of the spring brake actuator rod 56, yet is restrained by an inwardly directed annular flange 80 at the actuator rod proximal end 57. Thus, withdrawal of the caging tool 70 by rotation of the hex head nut 78, causes the enlarged head portion 72 to abut the annular flange 80, and retract the pressure plate 58 and compression spring 60. For safety, the compression spring 60 is typically retracted during repairs to the brake actuator 10 and during shipping.

The cylindrical head 48 includes one or more ports 81 therein which establish communication between the first spring chamber portion 62 and the atmosphere. A one-way vent 82, installed in each port 81, controls the flow of air through the port from the first spring chamber portion 62 to the atmosphere. Preferably, the one-way vent 82 vents air to the atmosphere whenever the pressure differential between the first spring chamber 62 and the atmosphere is approximately 2 psig. The one-way vent 82 prevents the movement of air from the atmosphere into the first spring chamber 62.

In accordance with a first embodiment of the invention, a normally-closed check valve 100 extends through the movable member in an aperture which fluidly connects the first and second spring chambers 62, 63. The check valve 100 defines a fluid conduit between the first and second spring brake chambers and through which the check valve controls fluid flow between the first spring brake chamber 62 and the second spring brake chamber 63 to reduce or retard the vacuum in the first spring brake chamber 62 during application of the spring brake 14 so that the application time of the spring brake 14 is not retarded by the vacuum. In FIG. 1, it can be seen that the check valve extends through the pressure plate 58 and the spring brake diaphragm 52. However, it is within the scope of the invention for the check valve 100 to extend through only the spring brake diaphragm 52 or pressure plate 58 depending on the configuration of the spring brake actuator 14.

Figure 2:
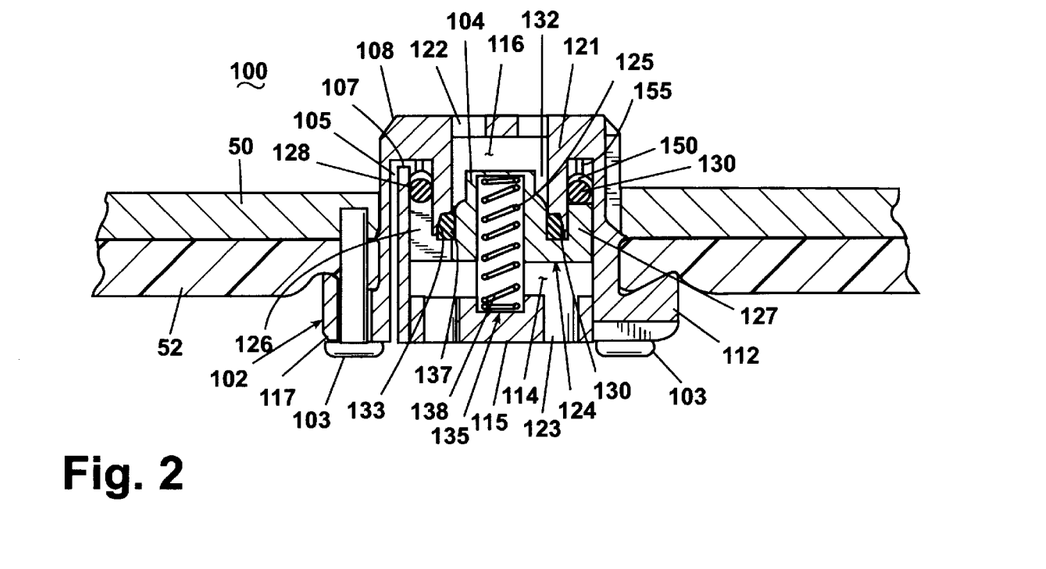
FIG. 2 is an enlarged, fragmentary cross-sectional view of a portion of the check valve of FIG. 1 in the normally closed position.
Figure 3:
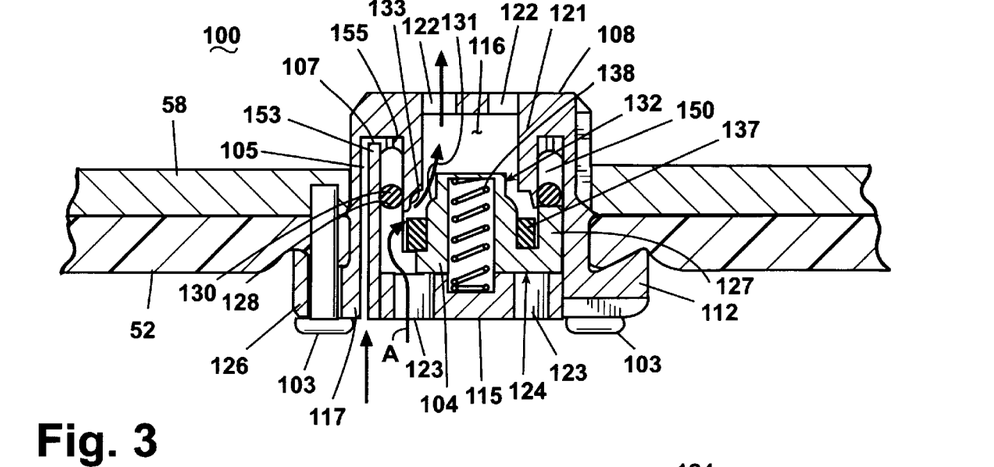
FIG. 3 is a view similar to FIG. 2 but showing the check valve in the open position.

As best shown in FIGS. 2 and 3, the check valve 100 is a normally-closed, two-stage valve comprising a body 102 defining the fluid conduit. The valve body 102 is secured to the pressure plate 58 by rivets 103, and containing a movable valve element, such as a piston or poppet 104. A first stage, or a valve-closed position, is shown in FIG. 2, and a second stage, or a temporary valve-open position, is shown in FIG. 3. The particular stage is defined by the position of the poppet 104 within the body 102.

The body 102 is generally tubular in shape with an annular rim 112 extending radially outwardly at one end. The body 102 is connected to the pressure plate 58 so that the rim 112 compresses the spring brake diaphragm 52 against the pressure plate 58 to provide a pressure seal between (2) chambers.

The body 102 has a base portion 108 and an end wall or cap 115 that, together with a tubular wall 117, define a cavity 114 within which the poppet 104 moves. An annular rib 121 extends into the cavity 114 from the base portion 108 to define an inner cylindrical chamber 116 and an outer tubular chamber 150. The cap 115 has multiple circumferentially spaced fluid apertures 123 therethrough for fluidly connecting the cavity 114 with the second spring brake chamber 63. In essence, the cavity or recess 114 is, from a fluid perspective, a part of the second spring brake chamber 63 because they are always in fluid communication.

The base portion 108 has multiple circumferentially spaced fluid apertures 122 that connect the inner cylindrical chamber 116 with the first spring brake chamber 62. The body 102 further includes an orifice 105 comprising a narrow channel through the tubular wall 117 to establish fluid communication between the second spring brake chamber 63 and the outer tubular chamber 150. One end of a spring 138 abuts the cap 115 and the other end abuts the poppet 104, whereby the poppet 104 is biased into the recess 114.

The outer tubular chamber 150 includes a bottom surface 153 approximately planar with a lower edge of a metering aperture 107 of the orifice 105. The metering aperture 107 is a reduced cross-sectioned opening joining the outer tubular chamber 150 and the orifice 105 and functions as a flow restrictor. The bottom surface 153 includes multiple upstanding integral ribs 155 for preventing any obstruction to the metering aperture 107 of the orifice 105.

Figure 3A:
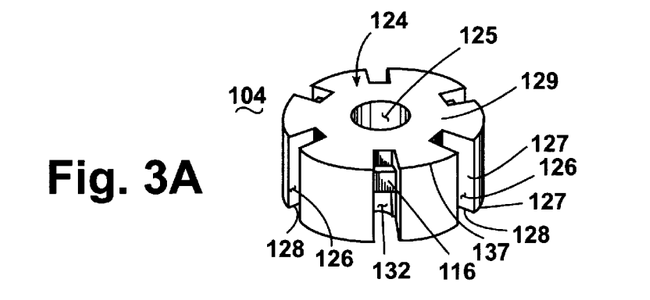
FIG. 3A is a perspective view of a poppet body of the check valves of FIGS. 2.

As best illustrated in FIG. 3A, the poppet 104 comprises a central cylindrical body 124 surrounded by an annular tubular rim 127. The poppet 104 also has a face 129 opposite the rim 127 and the body 124 which faces the cap 115. The rim 127 has a series of axial slots 126 disposed about the circumference of the poppet 104 and extending through the face 129. The annular tubular rim 127 reciprocates within the outer tubular chamber 150 while the central cylindrical body 124 is simultaneously received within the inner cylindrical chamber 116, as best illustrated in FIGS. 2 and 3. The rim 127 has a concave tip 128 that receives an elastomeric O-ring 130, which effectively seals the outer tubular chamber 150 from the remainder of the cavity 114. The body 124 has an internal cup 125 open through the face 129 that receives one end of the spring 138. The other end of the spring 138 rests in a recess 135 of the cap 115.

The terminal end of the annular rib 121 is contoured to define a seat 133. A congruently contoured the outer surface 131 of the poppet body 124 cooperates with the seat 133 to define a fluid passageway 132 between the inner cylindrical chamber 116 and the axial slots 126. A seal 137, preferably constituting lathe cut rubber, lies on the poppet 104 in the space between the central cylindrical body 127 and the annular tubular rim 127 in a position to close the passageway 132 when the poppet is in a closed position as shown in FIG. 2.

When the poppet 104 is in the open position shown in FIG. 3, the first and second spring brake actuator chambers 62, 63 are in fluid communication as shown by the fluid flow path A. The path A is open from the first spring brake actuator chamber 62 via multiple passages 122, the inner cylindrical chamber 116, the passageway 132, the axial slots 126, and the multiple passages 123, to the second spring brake chamber 63.

The spring 138 biases the poppet to the closed position shown in FIG. 2, thereby normally blocking the path A. However, the axial travel of the poppet 104 is limited by the cap 115, against which the face 129 rests when the bias of the spring 138 is overcome.

In operation, the check valve 100 operates in two stages. Initially, the check valve 100 is in the closed position as illustrated in FIG. 2. As the second spring brake actuator chamber 63 is filled with pressurized fluid, the fluid fills the recess 114, which is effectively, in a fluid sense, part of the second spring brake chamber. The pressurized fluid also travels from the second spring chamber 63 to the annular chamber 150 through the orifice 105 in the connector body 112. The orifice 105, including the metering aperture 107, is a fluid passageway that accommodates fluid communication between the second spring brake chamber 63 and the annular chamber 150, while small cross-sectional area of the metering aperture 107 limits the rate at which fluid pressure changes in the annular chamber 150 in response to changes in pressure in the second spring brake chamber 63. Thus, it takes longer for the annular chamber 150 to reach the same pressure as the second spring brake chamber 63. The annular chamber 150 functions as a fluid reservoir for the pressurized fluid in the second spring brake chamber 63, which can apply a force to the rear surface of the poppet.

During pressurization of the second spring brake chamber 63 and annular chamber 150, the poppet 104 remains biased out of the recess 114 by the spring 138 in combination with the pressurized air in the second spring chamber 63 acting on the face 129 of the poppet 104. The pressure in the first spring chamber 62 offers little to no contact force because the first spring chamber is substantially at atmospheric pressure. Once the pressure of the second spring brake chamber 63 and the annular chamber 150 equalize, the spring 138 alone biases the poppet 104 out of the recess 114. Thus, the check valve 100 is normally closed.

Upon exhaustion of the pressurized air from the second spring brake chamber 63, a pressure differential is formed between the second spring brake actuator chamber 63 and the annular chamber 150, which at a certain level the poppet 104 opens into the recess 114 and the check valve 100 enters the second stage.

In the second stage, upon the exhaustion of the pressurized air from the second spring brake actuator chamber 63, the pressure drop across the poppet 104 greatly increases. More particularly, the pressure in the annular chamber 150 is greater than the second spring brake chamber 63, which is quickly exhausting the pressurized air. While the second spring brake chamber 63 vents very quickly (approximately 1 second), the narrow cross-section of the metering aperture 107 limits the rate at which the annular chamber 150 can vent its pressurized air (approximately 4 to 7 seconds in the preferred embodiment) so as to match the air pressure of the fluidly connected second spring brake chamber 63.

The greater air pressure in the annular chamber 150 forces the poppet 104 outwardly into the recess 114 by overcoming the biasing force of the spring 138. More specifically, the pressurized air in the annular chamber 150 can expand because the offsetting air pressure of the second spring brake chamber 63 is no longer present. When the annular chamber 150 expands, it forces outwardly the O-ring 130 and, thus, the concave tip 128 of the annular projection 127 of the poppet body 124.

In this position, as best shown in FIG. 3, fluid pathways connecting the first and second spring brake chambers 62, 63 are exposed, which provide a conduit that fluid can flow through to equalize the pressure between the first spring brake actuator chamber 62 and the second spring brake actuator chamber 63 so that any vacuum that may form in the first spring brake actuator chamber 62 is quickly eliminated or prohibited by the increased flow of fluid through the pathways 132 and slots 122 and 123 through opposite ends of the body 108.

The expansion of the annular chamber 150, and thus the force maintaining the poppet 104 in the chamber 114, is short-lived. Within approximately 4 to 7 seconds, the pressure in the annular chamber 150 is equalized with the pressure of the second spring brake chamber 63, which is then at approximately atmospheric pressure. With the pressure equalized, the spring 138 biases the poppet 104 out of the recess 114, thereby closing the pathways 132 defined by the contours 131 in the poppet body 124 when the poppet 104 is in the open position best shown in FIG. 3. In this position, the seal 137 rests in the seat 133 to seal the pathway 132.

Figure 4:
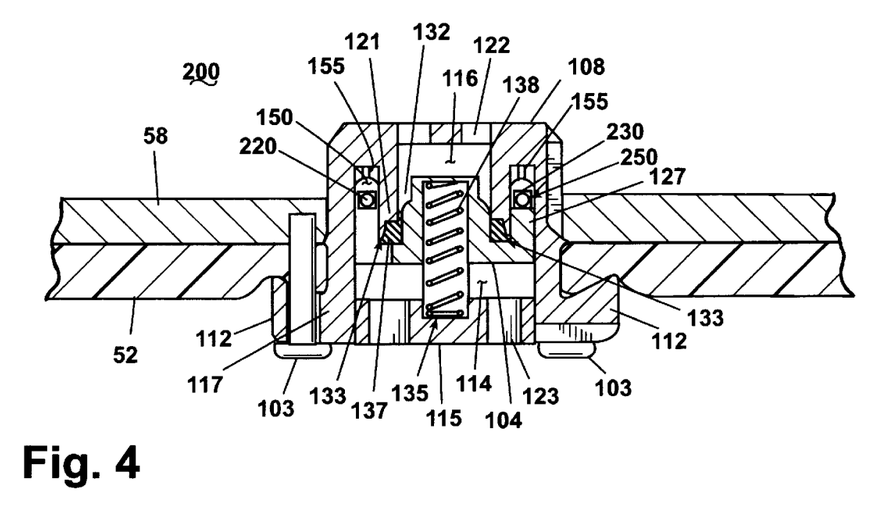
FIG. 4 is a view similar to FIG. 3 but showing a second embodiment of a check valve in a closed position.

In a second embodiment as best shown in FIG. 4, the structure and operation of a normally-closed check valve 200 is the same as the prior described check valve except that an imperfect seal assembly 210 is substituted for the metering aperture 107. The imperfect seal assembly 210 comprises an O-ring 220 and a pair of boots 230.

The U-shaped boots 230 flank to secure and partially cover the O-ring 220. The boots 230 are preferably made from a material having a low coefficient of friction, such as Teflon®, which is also resistant to corruption by moisture or heat when static for a long period of time, as is often the case with the spring brake assembly. The assembly 210 substantially blocks the annular chamber 150 from fluid communication with the recess 114 such that fluid flow between the second spring brake chamber 63, to which the recess 114 remains in fluid connection in all stages of operation of the brake, and the annular chamber 150 is limited.

The O-ring 220 flanked by the boots 230 does not seal the annular chamber 150 from the recess 116 and second spring brake chamber 63. Because of the imperfect fit of the boots 230, fluid flows through annular pathways 250 between the boot 230 and both the connector body 108 and the tubular wall 117, thereby providing a conduit for fluid flow between the recess 116 and the annular chamber 150. Much like the metering aperture 107 of the previously described embodiment, the narrow annular pathway 250 limits the fluid flow between, and thus the equalization of air pressure in, the second spring brake chambers 63 and the annular chamber 150. It should be noted that one boot 230 on either side of the O-ring 220 could be used so that there is either an outer or inner diameter seal with the O-ring 220, and an imperfect seal with the boot 230, to provide a fluid pathway.

Operation of this embodiment is the same as the prior embodiment, with the exception that fluid flows through the pathway 250 and recess 114, as opposed to the metering aperture 107, to equalize the air pressures between the second spring brake chamber 63 and the annular chamber 150. FIG. 4 shows the check valve 200 in its normally-closed position. In use, the small cross-sectional area of the pathway 250 limits the rate at which the annular chamber 150 can equalize its air pressure with second spring brake chamber 63 upon depressurization of the latter. When the second spring brake chamber 62 depressurizes to substantially atmospheric pressure, the spring 138 bias is overcome, the poppet 104 is forced into the recess 114, and the first and second spring brake chambers 62, 63 are in fluid communication via the pathways 132, similar to the fluid flow depicted in FIG. 3 for the first embodiment.

Figure 5:
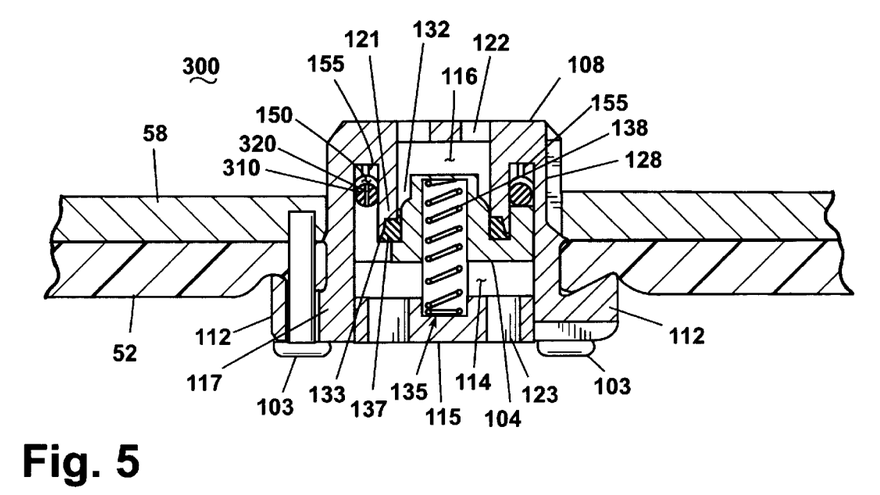
FIG. 5 is a view similar to FIG. 4 but showing a third embodiment of a check valve in the closed position.

A third embodiment, shown in FIG. 5, is a normally-closed check-valve 300 utilizing a small aperture or series of apertures 320 through an O-ring 310 to provide fluid communication between the annular chamber 150 and the second spring brake chamber 63. The remainder of the structure and the operation of this check valve is the same as the prior described embodiments, except there is no metering aperture 107 or imperfect seal assembly 210, which serve to distinguish each of those embodiments, respectively.

The small cross-sectional area of the apertures 320 limits the rate at which the annular chamber 150 can equalize its air pressure with second spring brake chamber 63 upon depressurization of the latter. Because of the lag in rate of equalization of the annular chamber 150, the bias of the spring 138 is overcome, the poppet 104 is forced into the recess 114, and the first and second spring brake chambers 62, 63 are in fluid communication via the pathways 132, similar to the fluid flow depicted by path A in FIG. 3 for the first embodiment.

Figure 6:
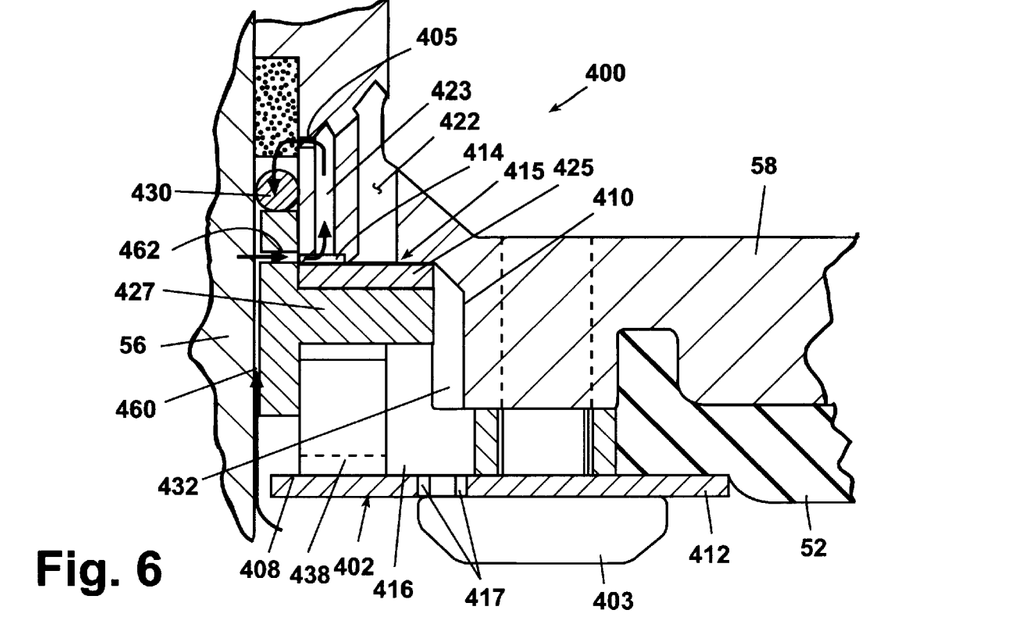
FIG. 6 is an enlarged, fragmentary view of a fourth embodiment of a check valve in a closed position.
Figure 7:
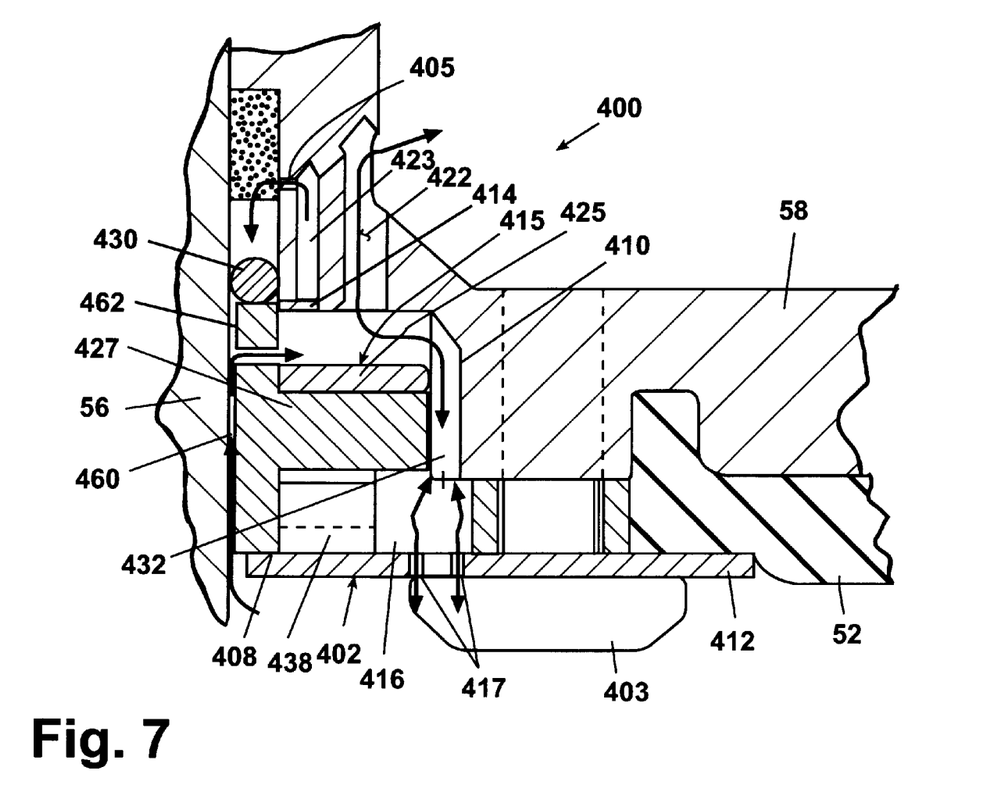
FIG. 7 is a view like FIG. 6 but showing the check valve of the fourth embodiment in an open position.

A fourth embodiment, illustrated in FIGS. 1, 6 and 7, is a normally-closed check-valve 400 mounted about the proximal end 57 of the push rod 56, which, as best seen in FIG. 1, extends coaxially through the opening 53 in the pressure plate and second elastomeric diaphragm 52, and terminates in the pressure plate 58 abutting the end of the large force compression spring 60. The check valve 400 is similar in operation to, but differs in construction from, the previously described embodiments.

The check valve 400 extends through the dividing means 52, 58, centrally disposed about the shaft 56, to fluidly connect the first and second spring chambers 62, 63. Like the previous embodiments, the check valve 400 includes means establishing flow between the first spring brake chamber 62 and the second spring brake chamber 63 to reduce the vacuum in the first spring brake chamber 62 during application of the spring brake 14 so that the application time of the spring brake 14 is not retarded by the vacuum. In FIG. 1, it can be seen that the check valve 400 extends through the pressure plate 58 and the spring brake diaphragm 52, while surrounding the shaft 56. However, it is within the scope of the invention for the check valve 100 to extend through only the spring brake diaphragm 52 or pressure plate 58 depending on the configuration of the spring brake actuator 14.

As best shown in FIGS. 6 and 7, the check valve 400 includes a body 402, which surrounds the actuator shaft 56, comprising a flat, annular body 408 from which extends an annular connector rim 412. The body 402 is connected to the pressure plate 58 by the rivets 403 so that the connector rim 412 compresses the spring brake diaphragm 52 against the pressure plate 58 to provide a pressure-tight seal between the chamber.

An open area between the body 402 and a bored-out portion 410 of the pressure plate 58 is divided by a poppet 404 into a pair of recesses 414, 416, each of which slidably receives the poppet 404. The recess 416 is substantially enclosed by the body 402, which has multiple circumferentially-spaced fluid apertures 417 therethrough for fluidly connecting the recess 416 with the second spring brake chamber 63. A spring 438, located between the body 402 and an outer edge of the poppet 404, biases the poppet 404 into the recess 414. The position of the poppet 404 controls fluid flow between the first and second spring brake chambers 62, 63.

Figure 7A:
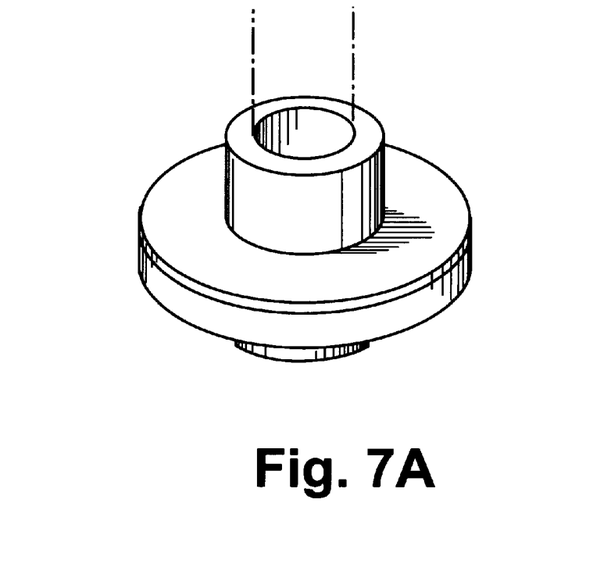
FIG. 7A is a perspective view of a poppet body of the check valve of FIGS. 6 and 7.

As best shown in FIG. 7A, the poppet 404 comprises a cylindrical body 424 having a plate-like, substantially horizontal, annular projection 427 extending therefrom and including a centrally-disposed aperture surrounding the push rod 56. The annular projection 427 includes a rubber seal 425, preferably constituting lathe cut rubber, mounted on a face thereof.

The spring 438, mounted within the recess 416 and surrounding the push rod 56, biases the poppet 404 out of the recess 416 and into the recess 414, as best shown in FIG. 6, thereby normally blocking a fluid pathway 432 defined by the bored-out portion of the plate 58. However, the axial travel of the poppet 404 is limited by an upper surface 415 of the lower recess 414, against which the seal 425 of the poppet 404 rests when the poppet 404 is in its normally closed position.

The bored-out portion 410 of the push rod plate 58 includes a pathway 432 for fluidly connecting the recess 414, 416 and multiple passages 422 for fluidly connecting the recess 414 with the first spring brake chamber 62, depending on the position of the poppet 404. When the poppet 404 is in the open position shown in FIG. 7, the first spring brake chamber 62 fluidly communicates with the second spring brake chamber 63 by the multiple passages 422 extending from the recess 414 through the push rod plate 58, the pathway 432 connecting the recess 414 and 416, and the multiple passages 417 extending from the recess 416 through the connector body 408. When the poppet 404 is in the closed position shown in FIG. 6, the first and second spring brake actuator chambers 62, 63 are not fluidly connected via the pathway 432, which is blocked by the position of the poppet 404 in the recess 414. In this position, the rubber seal 425 rests on the upper surface 415 of the recess 414 to make an airtight seal against the pathway 432 and the multiple apertures 422.

A first stage, or a valve-closed position, is shown in FIG. 6, and a second stage, or a temporary valve-open position, is shown in FIG. 7. The particular stage is defined by the position of the poppet 404 within the recess 416.

The embodiment shown in FIG. 6 includes an O-ring 430 separating the poppet 404 from the annular chamber 450. The O-ring 430 provides an airtight seal against the push rod 56 the poppet 404. A fluid pathway defined by an annular opening 460 between the poppet 404 and the push rod 56, multiple apertures 462 in he poppet 404 connecting the opening 460 and the recess 414, multiple apertures 423 connecting the recess 414 and a metering orifice 405, and the metering orifice 405 connecting multiple apertures 423 to the annular chamber 450. The multiple apertures 423 are parallel to the multiple apertures 422 in the plate 58, such that the fluid paths are separate.

Through the fluid pathway, the annular chamber 450 equalizes to the air pressure of the second spring brake chamber 63, albeit at a slower rate than the chamber 63 changes pressure in operation. Thus, when the second spring brake chamber 63 is pressurized during normal operation of the brake assembly, so to is the annular chamber 450, which exerts force on the poppet 404 via the O-ring 430. Because the spring brake chamber 63 typically remains at high pressure for a long period of time, the annular chamber 450 has the necessary time to equalize therewith. The poppet 404 does not move when the annular chamber 150 is pressurized, however, because the recess 416 is at the same air pressure as the annular chamber 450 and the second spring brake chamber 63. When the second spring brake chamber 63 is rapidly depressurized for actuation of the spring brake, the metering orifice 405 impedes the fluid flow from the annular chamber 450 to the second spring brake chamber 63 such that the pressure in the annular chamber 450 is greater than the pressure in the second spring brake chamber 63 for approximately 4 to 7 seconds. In this regard, the operation is similar to that described for the first three embodiments.

Figure 8:
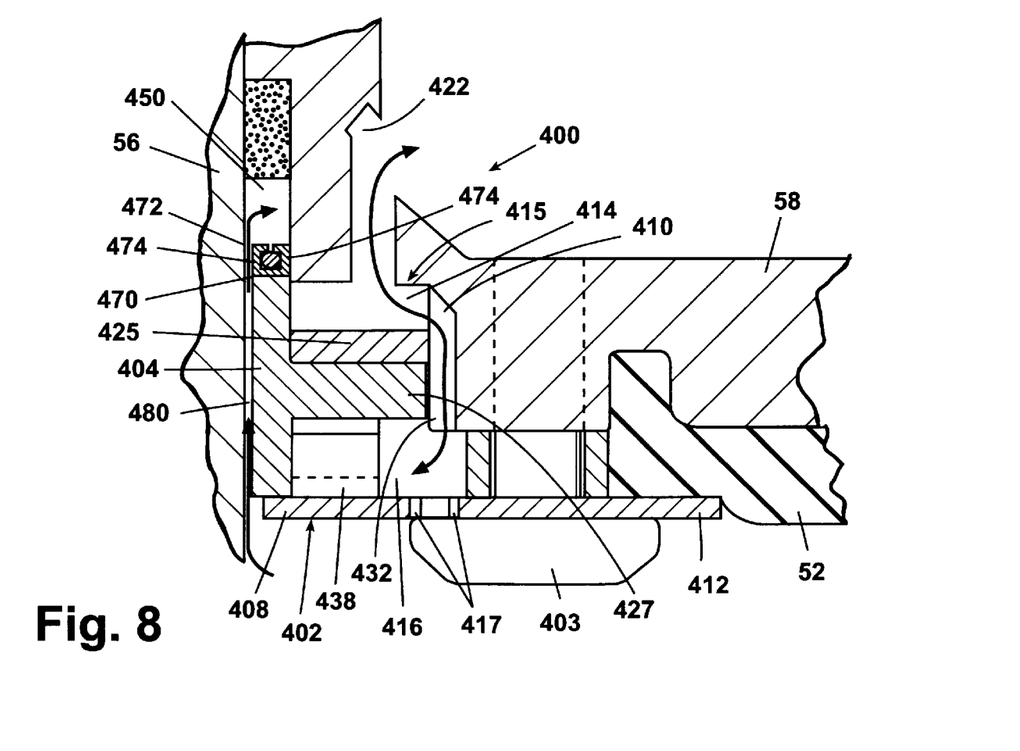
FIG. 8 is a view like FIG. 7 but showing the check valve of a fifth embodiment in the open position.

FIG. 8 illustrates an alternate embodiment of the two-stage valve of FIGS. 6 and 7. The alternative embodiment of FIG. 8 uses an imperfect seal assembly 470 comprising an O-ring 472 and a pair of boots 474 instead of the apertures 426, openings 423, and metering orifice 405 to form the fluid pathway from the second spring chamber 63 to the back side of the poppet. The U-shaped boots 474 flank to secure and partially cover the O-ring 472. Like the previous embodiment using the boots, the boots 474 are preferably made from Teflon®. The assembly 470 substantially blocks the annular chamber 450 from fluid communication with the second spring brake chamber 63 such that fluid flow between the second spring brake chamber 63 and the annular chamber 450 is limited.

The O-ring 472 flanked by the boots 474 does not seal the annular chamber 450 from the second spring brake chamber 63. Because of the imperfect fit, fluid flows through annular pathways 480 between each boot 474 and both the push rod 56 and the plate 58, thereby providing conduits for fluid flow between the second spring brake chamber 63 and the annular chamber 450. Much like the metering orifice 405 of the previously described embodiment, the narrow annular pathways 480 limits the fluid flow between, and thus the equalization of air pressure in, the second spring brake chambers 63 and the annular chamber 450. It should be noted that, as in the second embodiment, a single boot 474 and O-ring 472 can be used so that there is either an outer diameter seal and an upper imperfect inner diameter seal.

In use, the poppet 404 is forced against its bias into the recess 414, and the fluid pathway 432 between the first and second spring brake chambers 62, 63 is opened because the small cross-sectional area of the metering orifice 405 or pathway 460, depending on the embodiment, limits the rate at which the annular chamber 450 can equalize its air pressure with second spring brake chamber 63 upon depressurization of the latter. When the second spring brake chamber 62 depressurizes to substantially atmospheric pressure to actuate the spring brake, the spring 438 bias is overcome, the poppet 404 is forced into the recess 416, and the first and second spring brake chambers 62, 63 are in fluid communication via the pathways 432. This operation is substantially the same as that described for the first three embodiments.

Figure 9:
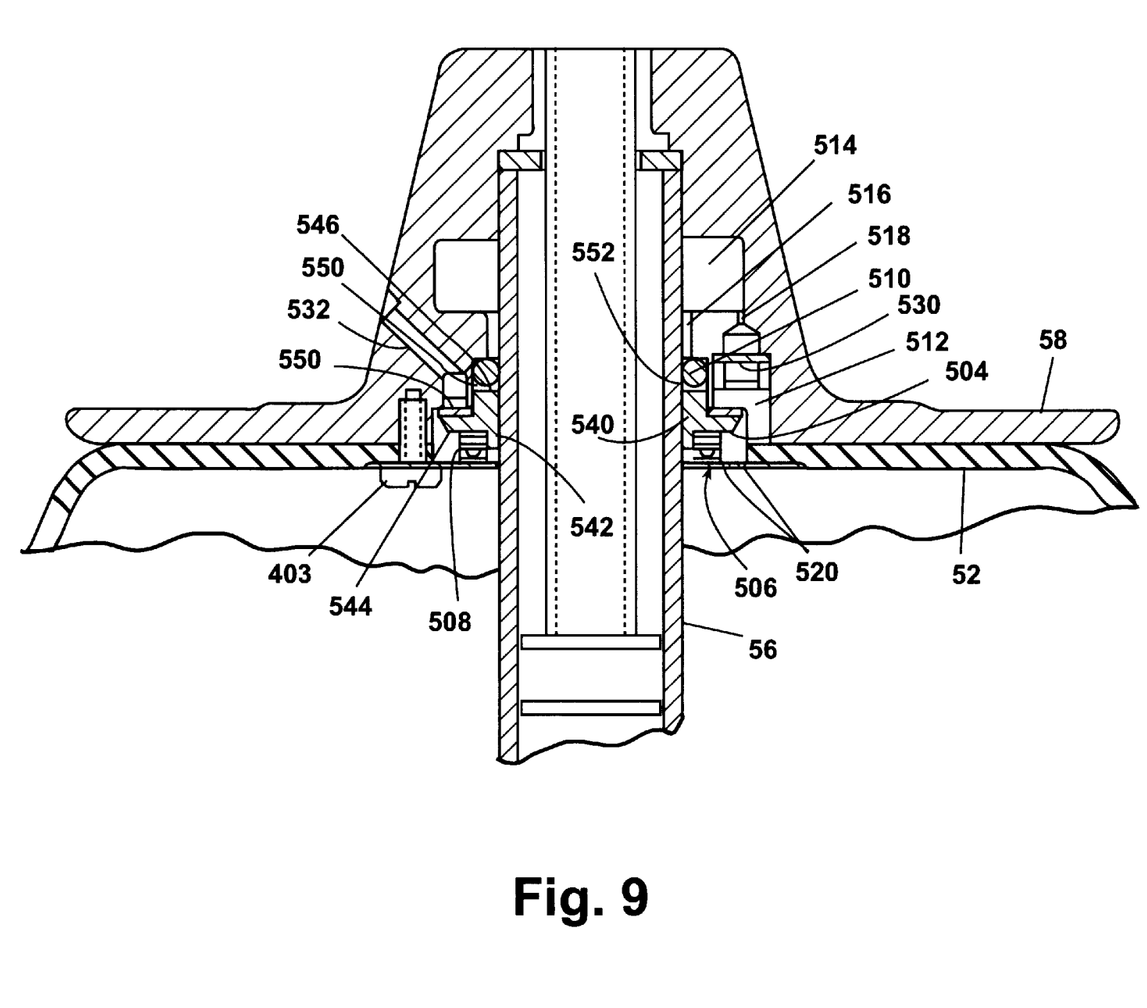
FIG. 9 is a view like FIG. 6 but showing a sixth embodiment of a check valve in a normal closed position.
Figure 10:
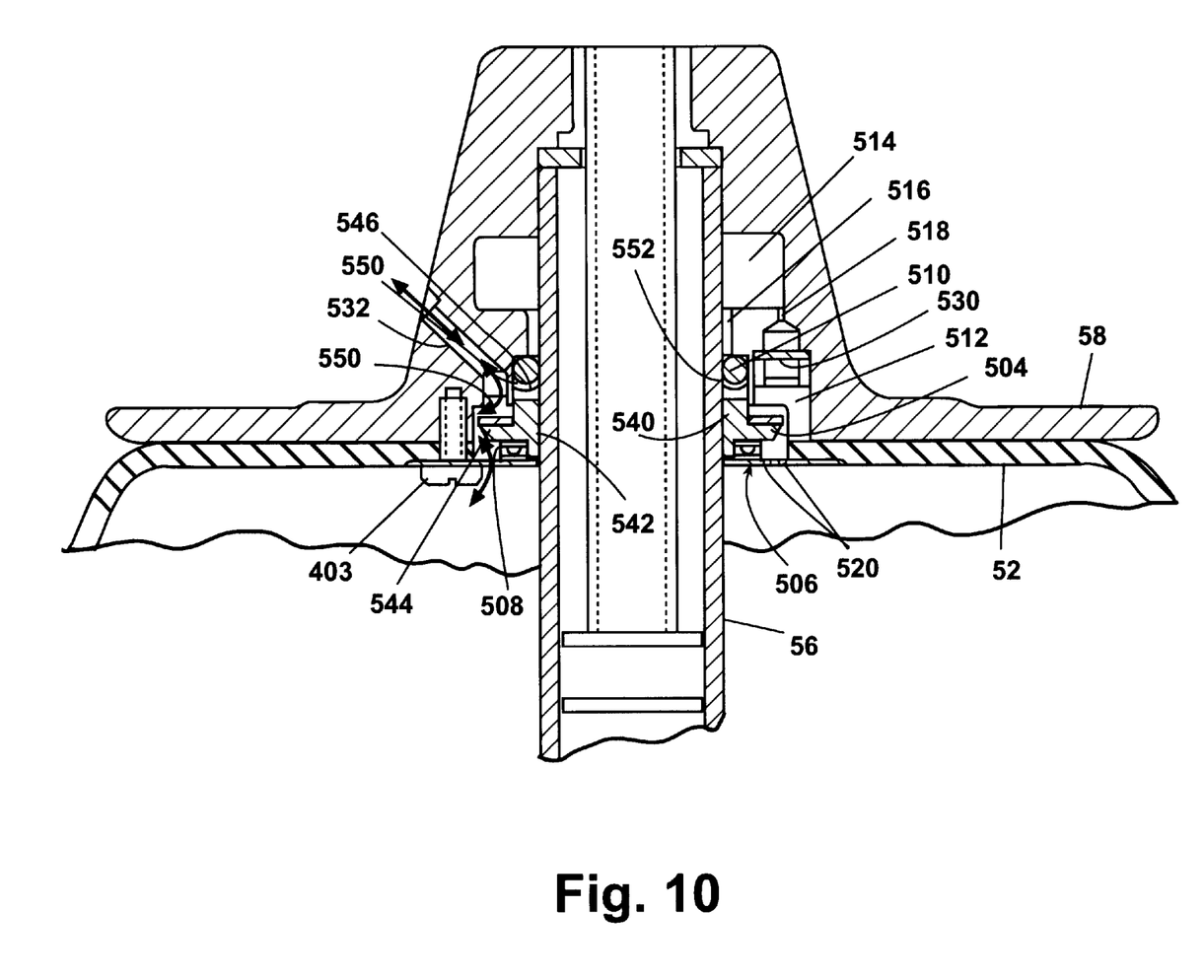
FIG. 10 is a view like FIG. 7 but showing the check valve of the sixth embodiment in an open position.

FIGS. 9 and 10 illustrate a sixth embodiment of the normally closed check valve according to the invention. The sixth embodiment 500 has many elements identical to elements described in a previous embodiment. Therefore, like elements will be identified by like numerals and only those aspects relevant to the sixth embodiment will be described in detail.

The fifth embodiment 500 is an annular, normally-closed, diaphragm check valve that is positioned about the shaft 56. The fifth embodiment annular check valve 500 includes a poppet 502 that is retained within a lower recess 504 in the pressure plate 58 by a cover or retainer 506. The poppet 502 is held in a normally closed position by an annular spring 508 disposed between the poppet 502 and the annular retainer 506. An O-ring 510 is disposed between the poppet 502 and the pressure plate in shaft 56 to fluidly seal the pressure plate 58 with respect to the shaft 56.

A fluid conduit 512 fluidly connects the lower recess 504 to an upper recess 514, which is in fluid communication with the backside of the poppet 502 through an annular channel 516, positioned just above the O-ring 510. The fluid conduit 512 includes a metering orifice 518 to restrict the flow rate of fluid from the second spring brake chamber 63 into the upper recess 514. The annular retainer 506 includes multiple openings 520 for providing additional fluid communication between the second spring brake chamber 63 and the lower recess 504.

A filter 530 is positioned within the fluid conduit 512 to filter the transfer of material from the second spring brake chamber 63 into the upper recess 514. Preferably, the filter is a fine membrane element made from a material such as Gortex™. A vent conduit 532 fluidly connects the lower recess 504 to the first spring brake chamber 62. The vent conduit 532 is closed when the poppet 502 is in the normally closed position.

The poppet 502 comprises an annular body 540 having a lower annular bearing surface 542, a radially extending flange 544 and an annular flange 546. The junction of the annular bearing surface 542 and a lower surface of the radial flange 544 forms a seat for receiving an upper portion of the annular spring 508.

A seal 550 is disposed on the upper surface of the radial flange 544. The seal 550 is preferably made from elastomeric material and contacts the pressure plate 58 to close the vent conduit 532 and seal the lower recess 504 with respect to the upper recess 514, except for fluid flow through the fluid conduit 512. An O-ring seat 552 is provided on the upper surface of the annular flange 546. Preferably, the O-ring seat 552 is made from elastomeric material and has a U-shaped upper surface that conforms with the peripheral shape of the O-ring 510. When the poppet 502 is in the normally closed position, the O-ring 510 is received within the O-ring seat 552.

The operation of the fifth embodiment normally closed diaphragm check valve will be described beginning with the pressurization of the second spring brake chamber 63. When the second spring brake chamber 63 is being pressurized, the pressure in the first spring brake chamber is generally at atmospheric pressure because of the one-way valve in the head. At the time when the second spring brake chamber 63 is being pressurized, the poppet 502 is in the normally closed position as illustrated in FIG. 9 because the annular spring 508 biases the poppet 502 upwardly until the radial flange 544 of the poppet contacts the portion of the pressure plate 58. The pressurization of the second spring brake chamber 63 adds additional force to urge the poppet 502 against the pressure plate 58 in addition to the annular spring 508.

As the second spring brake chamber 63 is pressurized, the pressurized fluid is free to flow through the multiple openings 520 in the annular retainer 506, into the fluid conduit 512, passing through the filter 530, where it is metered by the metering orifice 518, and ultimately reaching the upper recess 514 and the annular channel 516, through which pressure is applied to the back side of the poppet 502. Once the pressure in the upper recess 514 equalizes with the pressure in the spring brake chamber 63, the force supplied to the poppet 502 related to the pressure on the poppet's back side on the poppet's backside from the upper recess 514 and the pressure from the spring brake chamber 63 on the poppet's front side, will be equalized and the spring force applied by the annular spring 508 will hold the poppet 502 in the normally closed position as illustrated in FIG. 9.

The spring brake is normally maintained in this state for a substantially long period of time. Once pressurized, the only reason to depressurize the second spring brake chamber 63 is upon a complete failure of the air pressure system or the application of the emergency or parking brakes. When either one of the events occur, the second spring brake chamber 63 is immediately exhausted, creating a pressure differential between the upper recess 514 and the lower recess 504, because the pressurized air in the second spring brake chamber 63 is exhausted faster than the pressurized air and the upper recess 514 can pass through the metering orifice 518 into the lower recess 504 and thus the second spring brake chamber 63. The upper recess functions as a reservoir for the pressurized fluid. The temporary pressure differential creates a pressure drop across the back and front of the poppet. The force from the pressurized air in the upper recess 514 on the back side of the poppet 502 is sufficient to overcome the spring force on the front side of the poppet 502 applied by the annular spring 508. The pressure differential urges the poppet 502 downwardly toward the annular retainer 506 as disclosed in FIG. 10.

As the poppet 502 moves downwardly, the vent conduit 532 is opened to permit the flow of fluid from the first spring brake chamber 62 and the second spring brake chamber 63. As the power spring drives the pressure plate 58 downwardly, the pressure differential between the first spring brake chamber 62 and the second spring brake chamber 63 caused by the expanding volume of the first spring brake chamber 62, the shrinking volume of the second spring brake chamber 63, and the loss of pressurized fluid from the second spring brake chamber 63, is equalized by the free flow of air between the first and second spring brake chamber 62, 63 through the vent conduit 532.

The power spring moves the pressure plate 58 into contact with the adapter housing 20 in less than one second. The metering orifice 518 is sufficiently small enough to restrict the flow of fluid from the upper recess 514 to the lower recess 504 over a period of time greater than the application time of the spring brake, preferably from 4–7 seconds. After the power spring actuates the spring brake and the pressure plate 58 is driven into contact with the adapter housing, the pressure between the upper recess 514 and the lower recess 504 is substantially equalized and the poppet 502 returns to its normally closed position as illustrated in FIG. 7.

If for some reason after the application of the spring brake actuator, the pressure in the upper recess 514 never equalizes with the pressure in the now completely collapsed second spring brake chamber 63, the equalization will occur upon the pressurization of the second spring brake chamber 63 in the normal operating cycle.

All embodiments of the invention have the advantage of providing a simple method of eliminating the vacuum in the first spring brake chamber during the application of the spring brake. The invention accomplishes the elimination of the vacuum by a normally closed check valve having a movable poppet that is spring biased into the normally closed position in combination with maintaining a temporary pressurized source of air on the back side of the poppet that forms a pressure differential upon the exhaustion of the pressurized air from the first spring brake chamber. The temporary source of pressurized air will create a temporary pressure differential that moves the poppet from its normally closed position to an open position to fluidly connect the first spring brake chamber in the second spring brake chamber to thereby equalize the pressure between the first and second spring brake chambers, eliminating the creation of a vacuum in the first spring brake chamber.

The benefit of the two-stage, normally-closed check valves described herein is that the valve is normally closed to prevent fluid flow into the second spring brake chamber 63, which saves on wear of the parts and replacement of the brake assembly due to dirt from the outside air entering the second spring chamber 63. The assembly, however, provides for an increased area through which fluid can flow during the exhaustion of the pressurized air from the second spring brake actuator chamber 63 so that a greater quantity of fluid can flow from the second spring brake actuator chamber 63 into the first spring brake actuator chamber 62 to reduce or eliminate any vacuum that may form in the first spring brake actuator chamber 62, which would otherwise affect the reaction time of the spring brake.

Reasonable variation and modification are possible within the scope of the foregoing disclosure without departing from the spirit of the invention which is defined in the accompanying claims. For instance, a check valve can be used in the service chamber by extending through the service chamber diaphragm or both the service chamber diaphragm and the service chamber pressure plate. When used in the service brake chamber the pressurized chamber is the first service brake chamber, with the return spring in the second service brake chamber providing the force means acting against the pressurized chamber. Furthermore, the check valve of the invention can be used in a fluid-brake not having a tandem mounted spring and service chamber. Also, the check valve can be used in a piston-type spring brake. Additionally, either or both of the large force compression spring or the return spring can be replaced with alternative biasing means, such as pressurized air.

What is claimed is:

1. An air-operated spring brake actuator for actuating and releasing a brake in response to the introduction or exhaustion of pressurized air, comprising:
   a housing having a top wall and a bottom wall, connected by a peripheral side wall to define a spring brake chamber;
   a diaphragm provided in the housing to fluidly separate the spring brake chamber into a first spring brake chamber and a second spring brake chamber which is adapted for the introduction and exhaustion of pressurized air;
   a pressure plate provided in the first spring brake chamber in abutting relationship with the diaphragm;
   a spring having a first end and a second end and being positioned between the housing top wall and the pressure plate such that the first end of the spring abuts the housing top wall and the second end of the spring abuts the pressure plate;
   an actuator shaft having a proximal end and a distal end, the proximal end passing through an opening in the diaphragm and being connected to the pressure plate, and the distal end passing through an opening in the housing bottom wall; and
   a normally closed check valve defining a fluid conduit extending through at least one of the diaphragm and pressure plate to establish fluid communication between the first spring brake chamber and the second spring brake chamber, the check valve comprising:
      a moveable valve element having a back side and a front side, the valve element being moveable from a normally closed position where the valve element substantially prohibits fluid flow through the fluid conduit and an open position where the valve element does not block fluid flow through the fluid conduit, and the front side of the valve element being in fluid communication with the second spring brake chamber;
      a fluid reservoir in fluid communication with the moveable valve element back side; and
      a flow restrictor fluidly connecting the second spring brake chamber to the fluid reservoir;
   whereby upon the exhaustion of pressurized air from the second spring brake chamber, the spring moves the pressure plate and diaphragm toward the bottom wall to extend the actuator shaft, increase the volume of the first spring brake chamber, and create a pressure differential across the front and rear face of the moveable valve element because of the slower depressurization of the fluid reservoir through the flow restrictor than the depressurization of the second spring brake chamber to thereby move the moveable valve element from the normally closed position to the open position and permit air flow between the first and second spring brake chambers to reduce the likelihood of the creation of a vacuum in the first spring brake chamber.

2. An air-operated spring brake actuator according to claim 1, wherein the check valve includes a biasing device to bias the moveable valve element into the normally closed position.

3. An air-operated spring brake actuator according to claim 1, wherein the flow restrictor restricts the flow rate of air between the fluid reservoir and the second spring brake chamber to a rate less than the exhaustion rate of air from the second spring brake chamber.

4. An air-operated spring brake actuator according to claim 1, wherein the pressure plate includes a recess that is in fluid communication with the moveable valve element back side to define the check valve fluid reservoir.

5. An air-operated spring brake actuator according to claim 1 and further comprising a filter disposed within a fluid path connecting the second spring brake chamber to the fluid reservoir.

6. An air-operated spring brake actuator according to claim 5, wherein the filter forms at least a portion of the flow restrictor.

7. An air-operated spring brake actuator according to claim 1, wherein the flow restrictor is a fluid channel connecting the fluid reservoir and the second spring brake chamber.

8. An air-operated spring brake actuator according to claim 7, wherein the fluid channel has a reduced cross-sectional area portion to further restrict the flow of fluid through the fluid channel.

9. An air-operated spring brake actuator according to claim 1, wherein the flow restrictor is an imperfect seal positioned between the fluid reservoir and the second spring brake chamber.

10. An air-operated spring brake actuator according to claim 1, wherein the valve element is a poppet slidably mounted within the fluid conduit for movement between a first axial position corresponding to the normally closed position and a second axial position corresponding to the open position.

11. An air-operated spring brake actuator according to claim 10, wherein the poppet comprises an annular body defining a central opening through which the actuator shaft passes.

12. An air-operated spring brake actuator according to claim 11, wherein the pressure plate comprises a blind annular opening that receives the actuator shaft and the poppet, and the check valve further comprises an annular cover plate having a central opening through which passes the actuator shaft and the annular cover plate at least partially closes the blind opening to secure the poppet within the blind opening.

13. An air-operated spring brake actuator according to claim 12, wherein the pressure plate comprises a fluid chamber in fluid communication with the poppet back side to define the fluid reservoir and a vent port extending through the pressure plate to fluidly connect the first spring brake chamber and the blind annular opening to thereby partially define the fluid conduit, wherein, when the poppet is in the normally closed position, the poppet covers the vent port to block the flow of fluid between the first and second spring brake chambers, and, when the poppet is in the open position, the poppet is removed from the vent port to permit the flow of fluid between the first and second spring brake chambers.

14. An air-operated spring brake actuator according to claim 13 and further comprising a spring disposed between the cover plate and the poppet front surface to bias the poppet into the normally closed position.

15. An air-operated spring brake actuator according to claim 13, wherein the flow restrictor is a fluid channel connecting the fluid chamber and the second spring brake chamber, and the fluid channel has a reduced cross-sectional area portion to restrict the flow of fluid through the fluid channel.

16. An air-operated spring brake actuator according to claim 15 and further comprising a filter disposed within the fluid channel.

17. An air-operated spring brake actuator according to claim 13, wherein the central openings of the poppet and the annular cover plate are slightly greater than the outer diameter of the actuator shaft to form a gap therebetween that defines a portion of the fluid conduit and a seal is disposed at an upper end of the poppet to seal the actuator shaft relative to the poppet and separate the fluid chamber from the blind opening.

18. An air-operated spring brake actuator according to claim 17, wherein the seal is an imperfect seal that permits restricted fluid communication between the fluid chamber and the blind opening to define the flow restrictor.

19. An air-operated spring brake actuator according to claim 17, wherein the poppet annular body has at least one pass-through opening fluidly connecting the gap between the poppet and the actuator shaft to the air chamber to partially define the fluid conduit.

20. An air-operated spring brake actuator according to claim 19, wherein the pass-through opening is sized to restrict the flow of fluid and define the flow restrictor.

21. An air-operated spring brake actuator according to claim 10, wherein the check valve further comprises an annular body having a peripheral wall defining the fluid conduit.

22. An air-operated spring brake actuator according to claim 21, wherein the annular body includes a poppet seat against which the poppet rests when the poppet is in the first axial position and the poppet has at least one pass-through opening to permit fluid flow through the poppet, the pass-through opening is closed by the seat when the poppet is in the first axial position to substantially prevent fluid flow through the fluid conduit and close the check valve.

23. An air-operated spring brake actuator according to claim 22, wherein the annular body comprises a first end wall having at least one opening defining a fluid conduit inlet and a second end wall having at least one opening defining a fluid conduit outlet, the poppet seat is a substantially circular wall extending axially from the first end wall, the at least one opening in the first end wall is located within the circular wall, and the fluid reservoir is partially defined by the annular body peripheral wall, first end wall, and the circular wall.

24. An air-operated spring brake actuator according to claim 23, wherein the peripheral wall comprises a fluid bypass conduit extending from the second end wall into the fluid reservoir to define the flow restrictor.

25. An air-operated spring brake actuator according to claim 24, wherein the bypass conduit includes a reduced diameter portion to further restrict the flow of fluid through the bypass conduit.

26. An air-operated spring brake actuator according to claim 23, wherein the check valve further comprises an imperfect seal positioned between the circular wall and peripheral wall to permit restricted fluid flow between the fluid reservoir and the at least one pass-through opening to define the flow restrictor and establish fluid communication between the fluid reservoir and the second spring brake chamber.

27. A fluid-operated spring brake actuator according to claim 26 and further comprising a service brake actuator comprising:

a service brake housing having a top wall, a bottom wall, and a peripheral wall connecting the top and bottom walls to define a service brake chamber and the top wall having an opening through which passes the actuator shaft:

a moveable member provided in the service brake housing and fluidly separating the service brake chamber into a first service brake chamber and a second service brake chamber and the first service brake chamber is adapted for the introduction and exhaustion of pressurized air;

a service brake push rod provided in the second service brake chamber and having a proximal end abutting the moveable member and a distal end extending through an opening in the service brake bottom wall and adapted to be connected to a vehicle brake; and a return spring compressibly mounted between the service brake moveable member and the service brake bottom wall to bias the moveable member toward the top wall;

whereby when the spring brake actuator extends the actuator shaft, the actuator shaft contacts the service brake moveable member to actuate the vehicle brake.

28. A fluid-operated spring brake actuator according to claim 27 and further comprising an adapter housing defining the spring brake bottom wall, the service brake top wall, and a portion of the spring brake and service brake peripheral walls.

29. An air-operated spring brake actuator for actuating and releasing a brake in response to the introduction or exhaustion of pressurized air, comprising:

a housing having a top wall and a bottom wall, connected by a peripheral side wall to define a spring brake chamber;

a moveable member provided in the housing and fluidly separating the spring brake chamber into a first spring brake chamber and a second spring brake chamber, which is adapted for the introduction and exhaustion of pressurized air;

a spring having a first end and a second end and positioned between the housing top wall and the moveable member such that the first end of the spring abuts the housing top wall and the second end of the spring abuts the moveable member;

an actuator shaft having a proximal end and a distal end, the proximal being connected to the pressure plate, and the distal end passing through an opening in the housing bottom wall; and a normally closed check valve defining a fluid conduit extending through moveable member to establish and control fluid communication between the first spring brake chamber to the second spring brake chamber, the check valve comprising:

a moveable valve element having a back side and a front side, the valve element being moveable from a normally closed position where the valve element substantially prohibits fluid flow through the fluid conduit and an open position where the valve element does not block fluid flow through the fluid conduit, and the front side of the valve element being in fluid communication with the second spring brake chamber;

a fluid reservoir in fluid communication with the moveable valve element back side; and a flow restrictor fluidly connecting the second spring brake chamber to the fluid reservoir;

whereby upon the exhaustion of pressurized air from the second spring brake chamber, the spring moves the pressure plate and diaphragm toward the bottom wall to extend the actuator shaft, increase the volume of the first spring brake chamber, and create a pressure differential across the front and rear face of the moveable valve element because of the slower depressurization of the fluid reservoir through the flow restrictor than the depressurization of the second spring brake chamber to thereby move the moveable valve element from the normally closed position to the open position and permit air flow between the first and second spring brake chambers to reduce the likelihood of the creation of a vacuum in the first spring brake chamber.

30. A fluid-operated spring brake actuator according to claim 29, wherein the moveable member is a diaphragm.

31. A fluid-operated spring brake actuator according to claim 29, wherein the check valve includes a biasing device to bias the moveable valve element into the normally closed position.

32. A fluid-operated spring brake actuator according to claim 29, wherein the flow restrictor restricts the flow rate of fluid between the fluid reservoir and the second spring brake chamber to a rate less than the exhaustion rate of air from the second spring brake chamber.

33. A fluid-operated spring brake actuator according to claim 29, wherein the pressure plate includes a recess that is in fluid communication with the moveable valve element back side to define the check valve fluid reservoir.

34. A fluid-operated spring brake actuator according to claim 29, and further comprising a filter disposed within a fluid path connecting the second spring brake chamber to the fluid reservoir.

35. A fluid-operated spring brake actuator according to claim 34, wherein the flow restrictor is a fluid channel fluidly connecting the fluid reservoir and the second spring brake chamber.

36. A fluid-operated spring brake actuator according to claim 35, wherein the fluid channel has a reduced cross-sectional area portion to further restrict the flow of fluid through the fluid channel.

37. An air-operated spring brake actuator according to claim 29, wherein the flow restrictor is an imperfect seal positioned between the fluid reservoir and the second spring brake chamber.

38. An air-operated spring brake actuator according to claim 29, wherein the valve element is a poppet slidably mounted within the fluid conduit for movement between a first axial position corresponding to the normally closed position and a second axial position corresponding to the open position.

39. An air-operated spring brake actuator according to claim 38, wherein the pressure plate comprises a blind annular opening concentrically receives the actuator shaft and the poppet, the check valve further comprises an annular cover plate having a central opening through which passes the actuator shaft and the annular cover plate at least partially closes the blind opening to secure the poppet within the blind opening, and the poppet comprises an annular body defining a central opening through which the actuator shaft passes and the annular body is moveable between the first axial position and the second axial position.

40. An air-operated spring brake actuator according to claim 39, wherein the pressure plate comprises a fluid chamber in fluid communication with the poppet back side to define the fluid reservoir and a vent port extending through the pressure plate to fluidly connect the first spring brake chamber and the blind annular opening to thereby partially define the fluid conduit, wherein, when the poppet is in the normally closed position, the poppet covers the vent port to block the flow of fluid between the first and second spring brake chambers and, when the poppet is in the open position, the poppet is removed from the vent port to permit the flow of fluid between the first and second spring brake chambers.

41. An air-operated spring brake actuator according to claim 40 and further comprising a spring disposed between the cover plate and the poppet front surface to bias the poppet into the normally closed position.

42. An air-operated spring brake actuator according to claim 38, wherein central openings of the poppet and the annular cover plate are slightly greater than the outer diameter of the actuator shaft to form a gap therebetween that defines a portion of the fluid conduit and a seal is disposed at an upper end of the poppet and sealing the actuator shaft relative to the poppet.

43. An air-operated spring brake actuator according to claim 29, wherein the central openings of the poppet and the annular cover plate are slightly greater than the outer diameter of the actuator shaft to form a gap therebetween that defines a portion of the fluid conduit and a seal is disposed at an upper end of the poppet to seal the actuator shaft relative to the poppet and separate the fluid chamber from the blind opening.

44. An air-operated spring brake actuator according to claim 43, wherein the annular body comprises:

a first end wall having at least one opening defining a fluid conduit inlet;

a second end wall having at least one opening defining a fluid conduit outlet;

a poppet seat including an annular wall circumscribing the first wall at least one opening and against which the poppet rests when the poppet is in the first axial position and the fluid reservoir is partially defined by the annular body peripheral wall, first end wall, and the circular wall;

a bypass conduit is provided in the peripheral wall and fluidly connects the fluid reservoir to the spring brake second chamber to define the flow restrictor; and the poppet has at least one pass-through opening which is closed by the seat when the poppet is in the first axial position to substantially prevent fluid flow through the fluid conduit and close the check valve and the at least one pass-through opening is not closed by the seat when the poppet is in the second axial position to permit fluid flow through the fluid conduit and open the check valve.

45. An air-operated spring brake actuator according to claim 44, wherein the bypass conduit includes a reduced diameter portion to further restrict the flow of fluid through the bypass conduit.

46. An air-operated brake actuator for actuating and releasing a brake in response to the introduction or exhaustion of pressurized air, comprising:

a housing defining an interior chamber adapted to hold pressurized air;

a movable member mounted within the housing and dividing the interior chamber into a first brake chamber and a second brake chamber, one of which is adapted to normally receive pressurized air to urge the movable member to move in a first direction, the movable member having a fluid conduit therethrough to establish fluid communication between the first brake chamber and the second brake chamber;

force means to urge the movable member in a second direction opposite the first direction;

an actuator shaft having a proximal end and a distal end, the proximal end being operatively connected to the moveable member, and the distal end extending through an opening in the housing for connection to a brake; and a check valve mounted to the movable member at the fluid conduit, with a moveable valve element having a back side and a front side, the valve element being moveable from a normally closed position where the valve element substantially prohibits fluid flow through the fluid conduit and an open position where fluid flow through the fluid conduit is enabled, and the front side of the valve element being in fluid communication with the pressurized brake chamber;

a reservoir in fluid communication with the moveable valve element back side; and a flow restrictor fluidly connecting the pressurized brake chamber to the reservoir;

whereby when pressurized air from the pressurized brake chamber begins to be exhausted and the force means urges the movable member in one of the first and second directions, thereby increasing the volume of the non-pressurized brake chamber, a pressure differential across the front and rear sides of the moveable valve element is created because of the slower depressurization of the reservoir through the flow restrictor than the depressurization of the pressurized brake chamber, thereby urging the moveable valve element from the normally closed position to the open position to permit air flow between the first and second brake chambers, reducing vacuum retardation in the non-pressurized chamber.

47. An air-operated brake actuator according to claim 46, wherein the check valve includes a biasing device to bias the moveable valve element into the normally closed position.

48. An air-operated brake actuator according to claim 46, wherein the flow restrictor restricts the flow rate of air between the fluid reservoir and the pressurized brake chamber to a rate less than the exhaustion rate of air from the pressurized brake chamber.

49. An air-operated brake actuator according to claim 46, wherein the moveable member is a pressure plate that includes a recess in fluid communication with the moveable valve element back side to define the check valve fluid reservoir.

50. An air-operated brake actuator according to claim 46 and further comprising a filter disposed within a fluid path connecting the pressurized brake chamber to the fluid reservoir.

51. An air-operated brake actuator according to claim 50, wherein the filter forms at least a portion of the flow restrictor.

52. An air-operated brake actuator according to claim 46, wherein the flow restrictor is a fluid channel connecting the fluid reservoir and the pressurized brake chamber.

53. An air-operated brake actuator according to claim 52, wherein the fluid channel has a reduced cross-sectional area portion to further restrict the flow of fluid through the fluid channel.

54. An air-operated brake actuator according to claim 46, wherein the flow restrictor is an imperfect seal positioned between the fluid reservoir and the pressurized brake chamber.

55. An air-operated brake actuator according to claim 46, wherein the moveable member is a diaphragm.

56. An air-operated brake actuator according to claim 46, wherein the moveable member is a pressure plate.

57. An air-operated brake actuator according to claim 46, wherein the force means is a large force compression spring.

58. An air-operated brake actuator according to claim 46, wherein the force means is a return spring.

59. A air-operated brake actuator according to claim 46, wherein the brake actuator is a spring brake actuator.

60. A air-operated brake actuator according to claim 59 and further comprising a service brake actuator comprising:

a service brake housing having a top wall, a bottom wall, and a peripheral wall connecting the top and bottom walls to define a service brake chamber and the top wall having an opening through which passes the actuator shaft;

a moveable member provided in the service brake housing and fluidly separating the service brake chamber into a first service brake chamber and a second service brake chamber and the first service brake chamber is adapted for the introduction and exhaustion of pressurized air;

a service brake push rod provided in the second service brake chamber and having a proximal end abutting the moveable member and a distal end extending through an opening in the service brake bottom wall and adapted to be connected to a vehicle brake; and a return spring compressibly mounted between the service brake moveable member and the service brake bottom wall to bias the moveable member toward the top wall;

whereby when the spring brake actuator extends the actuator shaft, the actuator shaft contacts the service brake moveable member to actuate the vehicle brake.

61. An air-operated brake actuator according to claim 46, wherein the moveable valve element is a poppet slidably mounted within the fluid conduit for movement between a first axial position corresponding to the normally closed position and a second axial position corresponding to the open position.

62. An air-operated brake actuator according to claim 61, wherein the poppet comprises an annular body defining a central opening through which the actuator shaft passes.

63. An air-operated brake actuator according to claim 62, wherein the moveable member is a pressure plate having a blind annular opening that receives the actuator shaft and the poppet, and the check valve further comprises an annular cover plate having a central opening through which passes the actuator shaft and the annular cover plate at least partially closes the blind opening to secure the poppet within the blind opening.

64. An air-operated brake actuator according to claim 63, wherein the pressure plate comprises a fluid chamber in fluid communication with the poppet back side to define the fluid reservoir and a vent port extending through the pressure plate to fluidly connect the first spring brake chamber and the blind annular opening to thereby partially define the fluid conduit, wherein, when the poppet is in the normally closed position, the poppet covers the vent port to block the flow of fluid between the first and second spring brake chambers and, when the poppet is in the open position, the poppet is removed from the vent port to permit the flow of fluid between the first and second spring brake chambers.

65. An air-operated brake actuator according to claim 64 and further comprising a spring disposed between the cover plate and the poppet front surface to bias the poppet into the normally closed position.

66. An air-operated brake actuator according to claim 65, wherein the flow restrictor is a fluid channel connecting the fluid chamber and the second spring brake chamber, and the fluid channel has a reduced cross-sectional area portion to restrict the flow of fluid through the fluid channel.

67. An air-operated brake actuator according to claim 66 and further comprising a filter disposed within the fluid channel.

68. An air-operated brake actuator according to claim 61, wherein the central openings of the poppet and the annular cover plate are slightly greater than the outer diameter of the actuator shaft to form a gap therebetween that defines a portion of the fluid conduit and a seal is disposed at an upper end of the poppet to seal the actuator shaft relative to the poppet and separate the fluid chamber from the blind opening.

69. An air-operated brake actuator according to claim 68, wherein the seal is an imperfect seal that permits restricted fluid communication between the fluid chamber and the blind opening to define the flow restrictor.

70. An air-operated brake actuator according to claim 69, wherein the poppet annular body has at least one pass-through opening fluidly connecting the gap between the poppet and the actuator shaft to the air chamber to partially define the fluid conduit.

71. An air-operated brake actuator according to claim 70, wherein the pass-through opening is sized to restrict the flow of fluid and define the flow restrictor.

72. An air-operated brake actuator according to claim 61, wherein the check valve further comprises an annular body having a peripheral wall defining the fluid conduit.

73. An air-operated brake actuator according to claim 72, wherein the annular body includes a poppet seat against which the poppet rests when the poppet is in the first axial position and the poppet has at least one pass-through opening to permit fluid flow through the poppet, the pass-through opening is closed by the seat when the poppet is in the first axial position to substantially prevent fluid flow through the fluid conduit and close the check valve.

74. An air-operated brake actuator according to claim 73, wherein the annular body comprises a first end wall having at least one opening defining a fluid conduit inlet and a second end wall having at least one opening defining a fluid conduit outlet, the poppet seat is a substantially circular wall extending axially from the first end wall, the at least one opening in the first end wall is located within the circular wall, and the fluid reservoir is partially defined by the annular body peripheral wall, first end wall, and the circular wall.

75. An air-operated brake actuator according to claim 74, wherein the peripheral wall comprises a fluid bypass conduit extending from the second end wall into the fluid reservoir to define the flow restrictor.

76. An air-operated brake actuator according to claim 75, wherein the bypass conduit includes a reduced diameter portion to further restrict the flow of fluid through the bypass conduit.

77. An air-operated brake actuator according to claim 76, wherein the check valve further comprises an imperfect seal positioned between the circular wall and peripheral wall to permit restricted fluid flow between the fluid reservoir and the at least one pass-through opening to define the flow restrictor and establish fluid communication between the fluid reservoir and the second spring brake chamber.

* * * * *